T. K. IRWIN.
APPARATUS FOR TREATING LIQUIDS WITH GAS.
APPLICATION FILED DEC. 12, 1913.

Patented Feb. 23, 1915.

Inventor
T. K. Irwin

T. K. IRWIN.
APPARATUS FOR TREATING LIQUIDS WITH GAS.
APPLICATION FILED DEC. 12, 1913.

1,129,682.

Patented Feb. 23, 1915.
2 SHEETS—SHEET 2.

Witnesses

Inventor
T. K. Irwin,
Atty.

UNITED STATES PATENT OFFICE.

THOMAS KEMPLAY IRWIN, OF LONDON, ENGLAND.

APPARATUS FOR TREATING LIQUIDS WITH GAS.

1,129,682. Specification of Letters Patent. Patented Feb. 23, 1915.

Application filed December 12, 1913. Serial No. 806,300.

*To all whom it may concern:*

Be it known that I, THOMAS KEMPLAY IRWIN, a subject of His Majesty the King of England, residing at 5 London Wall Buildings, in the city of London, Kingdom of England, have invented certain new and useful Improved Apparatus for Treating Liquids with Gas, of which the following is a specification.

This invention relates to an improved apparatus for treating liquids with gas. The improved apparatus is suitable for almost all purposes where it is desired to aerate liquids, such for instance as in the treatment of waste liquids or sewage effluent which has to be disposed of or discharged into a stream, or in other manufacturing processes, such as the manufacture of mineral waters, in creameries and the like.

It has heretofore been proposed to employ centrifugal machines for filtering and straining liquids of various kinds, including sewage.

Now according to my invention, I employ a hydro-extractor or like centrifugal machine for treating liquids with gas. The machine has an annulus of porous material arranged therein in a suitable manner, such for instance as hereinafter described.

As my invention is particularly suitable for the treatment of sewage and sewage effluent I will hereinafter describe the same as applied to this particular purpose.

Figure 1:
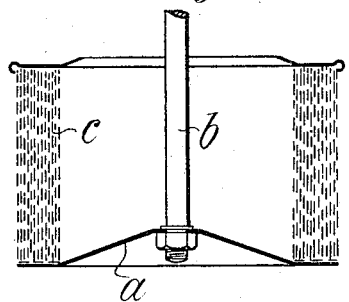
Figure 6:
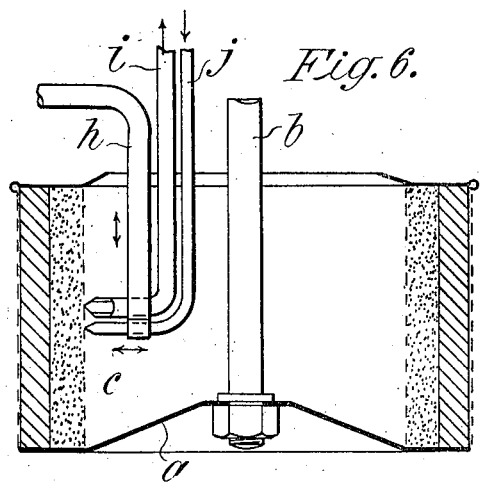
Figure 7:
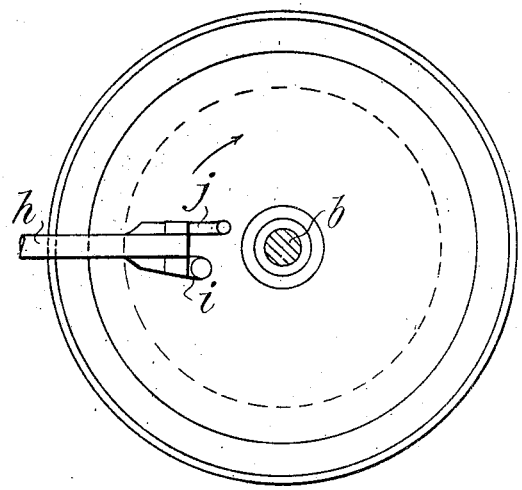

Referring to the accompanying drawings,—Figure 1 is a diagrammatic sectional elevation illustrating one suitable form of cage; Figs. 2 to 5 are similar views illustrating further modified forms designed for a like purpose; and Figs. 6 and 7 are two detail views showing in sectional elevation and plan respectively mechanism hereinafter referred to.

In carrying out my invention I employ a hydro-extractor for treating liquids with gas. The device as is usual comprises a cylindrical or other suitably shaped cage *a* conveniently perforated or open where desired and mounted on a central spindle *b* and it is for my purpose provided with a surrounding annulus of porous material through which the liquids to be filtered and aerated must pass. The said porous medium may be a series of layers of perforated plates or gauzes, sand or other loose material suitably arranged around the inside of the cage *a* as shown at *c* in Fig. 1, and such medium may also contain chemicals for the purpose of acting upon the liquids passing through it.

Figure 2:
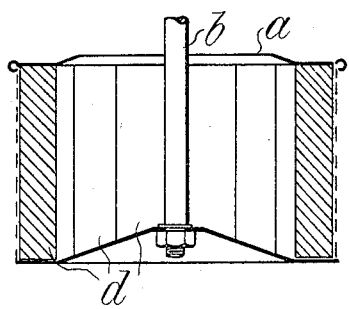
Figure 3:
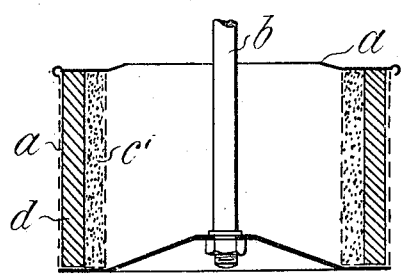

For obtaining the highest effects I employ an annulus of cement, porcelain, terra-cotta, or other like suitable solid porous medium which may either be arranged in the form of a solid ring or be built up from a plurality of segments *d* as shown by way of example in Fig. 2. If desired such a solid porous medium *d* may as shown in Fig. 3 be combined with a layer of sand or loose material *c'*. Where a solid porous medium is employed this may be suitably carried in separate segmental frames or carriers, so that it can be readily removed or replaced when desired; such frames making a tight joint between the porous medium and the cage.

Figure 4:
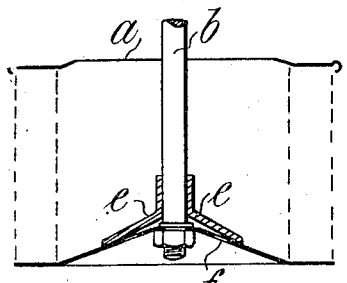
Figure 5:
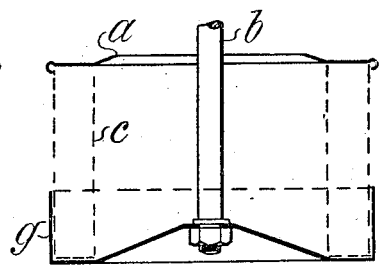

In some cases I may as shown in Fig. 4 provide a suitable form of discharge valve *e* which would be suitably arranged to slide away from or otherwise coöperate with and open ports *f* in the cage *a* when it is desired to discharge the contents, or a part of them, from the device. Another suitable form of valve which would also serve for the ejection of the medium *c* or its contained impurities or deposit consists in providing a sliding ring *g* (or segments of a ring) around the outside of the cage which when lifted or moved laterally or pivotally would uncover ports in the said cage of any suitable shape and size as will be readily understood. The medium *c* or its contents, may then be washed out with liquid or chemicals, the discharge taking place through these ports.

As before stated provision is generally made for cleaning the device by making the porous ring or segments removable, but if desired such cleaning may be effected without removal by means of suitable scraping or washing devices which are so arranged that they can be brought into suitable juxta- position with the inner surface of the annulus when the cage is in motion. Chemicals may also be used for the purpose either in powder or fluid form for cleaning the porous medium. These may be introduced periodically or continuously, and separately or, when practicable, in admixture with the fluid undergoing treatment.

Oxidation may be increased or treatment effected by the introduction of other gases than air into the cage, and other desired chemical changes may be brought about by this means, and the rate of flow of the air or other gases may be controlled to bring about such changes. Again if desired the air or other gases may be forced into the liquid under pressure.

Suitable devices by means of which the apparatus may be made continuous in its action are shown in Figs. 6 and 7 of the drawings. As shown I provide a suitable arm $h$ which is independently and movably mounted in relation to the cage and which carries a tubular device $i$ having a shaped end for removing the deposit or a portion of the loose porous medium together with the deposit and also a feed device or conduit $j$ for simultaneously depositing fresh porous material in place of that removed by the member $i$. Where such device is employed an inner annulus of loose porous material should always be provided as it is not practicable to remove a thin deposit from the cage or solid porous lining.

Aerating and filtering devices constructed according to my invention have been found to give excellent results in treating sewage effluent. In this connection apart from the importance of oxidizing the putrescible elements the presence of air in the effluent is necessary in order not to destroy fish life in streams, as it has been found that more damage is done by the absence of air (or oxygen) in waste liquids than by the presence of dangerous matter in suspension or solution, and such centrifugal machines are used not only to aerate but to oxidize a large proportion of the oxidizable matter in such waste liquids. These good results are caused by the drawing in of air with the liquid being driven through the porous medium as both are broken up into minute particles when passing through the medium and the contact is consequently intimate and the absorption or admixture most complete.

What I claim as my invention and desire to secure by Letters Patent of the United States is:—

1. In liquid aerating apparatus, a hydro-extractor or like centrifugal machine comprising a rotating cage, an annulus or wall of a loose and removable porous medium for the purpose described, and means for simultaneously removing and adding material to said wall.

2. In liquid aerating apparatus, a hydro-extractor or like centrifugal machine comprising a rotating cage, an annulus or wall of filtering material for the passage of the liquid to be aerated, and means for cleaning the said wall substantially as described, said cleaning means being further adapted for simultaneously adding material to and removing material from the wall.

3. In liquid aerating apparatus, a hydro-extractor or like centrifugal machine comprising a rotary cage, an annulus or wall of loose porous medium for the passage of the liquid to be aerated and means for removing and replacing the said porous material substantially as described.

In testimony whereof I have signed this specification in the presence of two subscribing witnesses.

THOMAS KEMPLAY IRWIN.

Witnesses:
J. S. WITHERS,
C. G. WITHERS.